Feb. 14, 1928.

K. LAUER 1,658,994

FEELING BOLT HOLE GAUGE

Filed Feb. 13, 1925

2 Sheets-Sheet 1

Feb. 14, 1928.

K. LAUER 1,658,994

FEELING BOLT HOLE GAUGE

Filed Feb. 13, 1925

2 Sheets-Sheet 2

Patented Feb. 14, 1928.

1,658,994

UNITED STATES PATENT OFFICE.

KARL LAUER, OF ESSEN, GERMANY, ASSIGNOR TO FRIED. KRUPP AKTIENGESELL-SCHAFT, OF ESSEN-ON-THE-RUHR, GERMANY.

FEELING-BOLT-HOLE GAUGE.

Application filed February 13, 1925, Serial No. 9,038, and in Germany March 1, 1924.

Feeling bolt hole gauges are already well-known in which all gauging and supporting bolts act on an inclined plane of a member movable angularly to their direction of movement. These gauges have the drawback that in testing obliquely or horizontally arranged bores the weight of the gauge disadvantageously influences the accuracy of the measuring. Besides, feeling bolt hole gauges are already known in which one of the gauging bolts is rigidly connected with the gauge casing and the supporting bolts are spring-pressed so as to be movable outwards independently from one another and from the gauging bolts. With these gauges a perfect measuring is likewise impossible as, owing to the yieldingness of the supporting bolts, it may easily occur that a chord instead of the diameter of the bore to be tested is measured.

The invention has for its object to avoid the said drawbacks and to provide a feeling bolt hole gauge which permits of the most accurate measuring not only of vertical bores but also of obliquely or horizontally disposed bores.

Figure 1:
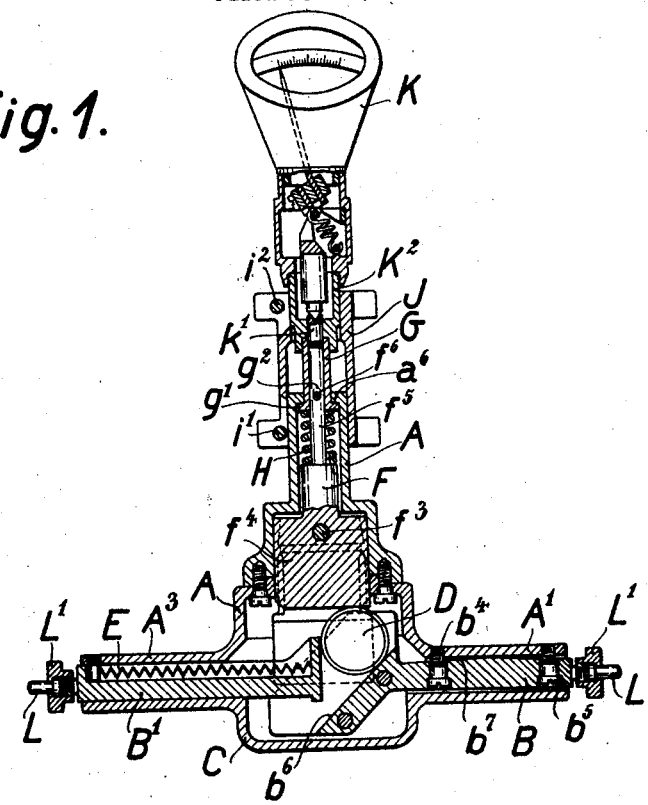
Figure 2:
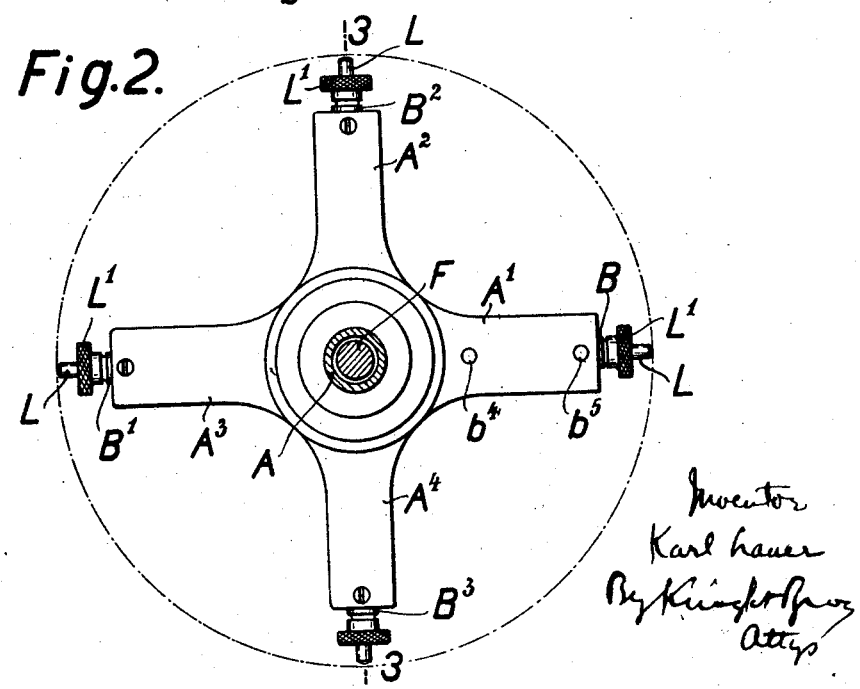

The invention will now be described with reference to the accompanying drawing which illustrates, as an embodiment of the subject-matter of the invention, a spreadable feeling bolt hole gauge, and in which:

Fig. 1 is a section through the gauge,

Fig. 2 the corresponding plan view, partly in section, and

Figure 3:
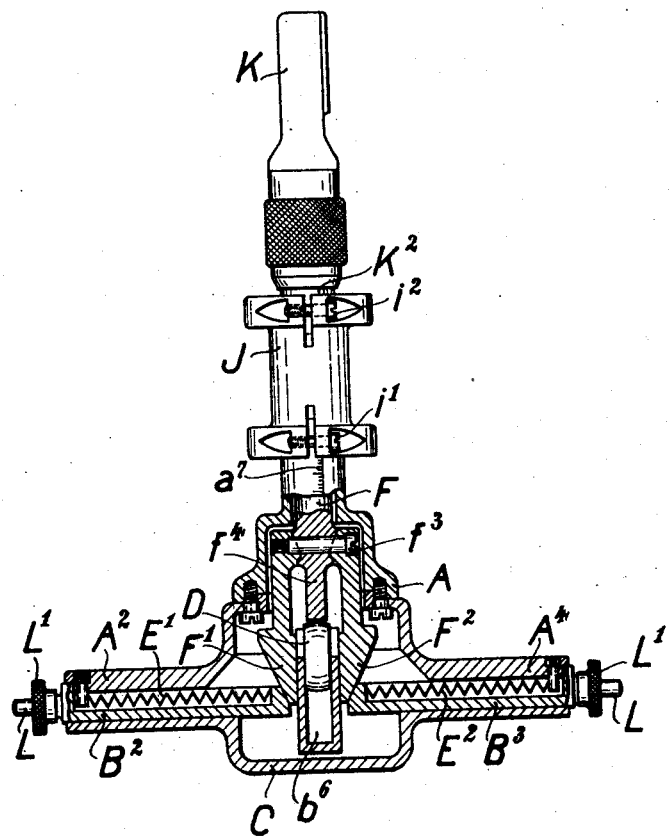

Fig. 3 an elevation of the gauge, partly in section, along the line 3—3 of Fig. 2.

A casing A, Fig. 1, having a cylindrical upper portion is provided at its lower end with four arms $A^1$ $A^2$ $A^3$ and $A^4$ U-shaped in cross section open at their lower side and having mounted in their hollow spaces two gauging bolts B and $B^1$ and two supporting bolts $B^2$ and $B^3$. The casing and the arms are closed at the lower side by a cover C. The distance between the end faces of the gauging bolts B and $B^1$ is preferably a little larger than the distance between the end faces of the supporting bolts $B^2$ and $B^3$. The upper surface $b^7$ of the gauging bolt B is curved. The gauging bolt B is by its curved edge in contact with the lower surface of the top of the arm $A^1$ and adjustably held in this position by means of screws $b^4$ and $b^5$. The end of the gauging bolt B lying towards the central longitudinal axis of the gauge casing is provided with a U-shaped groove $b^6$ which is inclined with relation to the said axis and open at its upper side. A rotary member D having the shape of a zone of a sphere is adapted to roll in the groove $b^6$, see Figs. 1 and 3. The inner end face of the shiftable gauging bolt $B^1$ bears against the circumference of the rotary member D under the action of a pressure spring E, Fig. 1. The two supporting bolts $B^2$ and $B^3$ are shiftable in the arms $A^2$ and $A^4$ in a manner similar to the gauging bolt $B^1$. They are placed under the action of two pressure springs $E^1$ and $E^2$, Fig. 3, by which the ends lying towards the central axis of the gauge are held in contact with two wedges $F^1$ and $F^2$ which are movable vertically with relation to the direction of movement of the bolts $B^2$, $B^3$. The said wedges are rigidly connected by means of a screw $f^3$ with a transfer bolt F which is mounted for longitudinal shifting motion in the casing A and provided at its lower end with a prismatic head $f^4$ extending between the wedges $F^1$ and $F^2$ and being in contact with the rotary member D, Figs. 1 and 3. On a cylindrical portion $f^5$ of the bolt F is shiftably mounted a sleeve G which has an annular collar $g^1$. The shifting movement of the sleeve G is limited by a contracted portion $a^6$ of the casing A. The portion $f^5$ carries a cross pin $f^6$ which engages an oblong hole $g^2$ of the sleeve G and permits the bolt F to make a slight longitudinal shifting movement with relation to the sleeve G. A spring H interposed between a shoulder of the bolt F and the collar $g^1$ of the sleeve G holds the cross pin $f^6$ in contact with the lower end face of the oblong hole $g^2$ when the gauge is in its position of rest. The spring H is so strong that it is able to overcome the pressure of the three springs E, $E^1$ and $E^2$ which act against it. A sleeve J, Fig. 1, slotted at its upper and lower end and surrounding the casing A is shiftable on the casing A and adapted to be clamped to the latter by means of a screw $i^1$. The upper end of the sleeve J which is provided with a clamping screw $i^2$, surrounds a precision indicator K of a known type the housing $K^2$ of which is in contact with the sleeve G while its feeling bolt $k^1$ is in contact with the bolt F. The outer screw-threaded ends of the gauging and feeling bolts have removably fixed to them by means of cap nuts $L^1$ a pin $L$ each (see particularly Fig. 1).

When introducing the gauge into the bore to be tested, the movable gauging bolt $B^1$, which bears against the rotary member $D$ under the action of the spring $E$ (Fig. 1), is pushed inwardly. At the same time, the member $D$ rolling along the inclined base of the groove $b^6$, exerts a pressure on the head $f^4$ of the bolt $F$ and shifts the same upwardly contrary to the action of the spring $H$. The inclination of the groove $b^6$ is adjustable by means of the two screws $b^4$ and $b^5$ so that the ratio of transmission between the shiftable gauging bolt $B^1$ and the feeling bolt $k^1$ of the precision indicator $K$ may be accurately regulated. The feeling bolt $k^1$ which is in contact with the bolt $F$ is likewise shifted upwardly by the latter, whereby the indicating device of the precision indicator $K$ is caused to indicate in a manner known the measure of the shifting movement of the gauging bolt $B^1$. The shifting movement of the bolt $F$ is limited by the oblong hole $g^2$, the dimensions of which are chosen in accordance with the measuring range of the precision indicator $K$. During the shifting movement of the transfer bolt $F$ the wedges $F^1$ and $F^2$ rigidly connected to it likewise change their position; they move upwardly too and the supporting bolts $B^2$ and $B^3$, Fig. 3, which are in contact with the wedges, follow the said movement under the action of the springs $E^1$ and $E^2$. The inclination of the wedges $F^1$ and $F^2$ and of the groove $b^6$ may be chosen so that a pressure exerted on the end faces of the supporting bolts $B^2$ or $B^3$ cannot produce a shifting movement of the bolt $F$ and therefore cannot actuate the indicating device, and that each supporting bolt is shifted by half the way made by the gauging bolt $B^1$. Therefore the outer distance between the end faces of the two gauging bolts always remains a little larger than the corresponding distance between the end faces of the two supporting bolts. If it is desired to change the measuring range of the gauge, the two clamping screws $i^1$ and $i^2$ are loosened and the gauge is introduced into a standard caliper ring of the corresponding size, whereupon the precision indicator $K$ and the sleeve $J$ are shifted with relation to each other and to the casing $A$ of the gauge until the indicating device registers with the zero mark. If the two clamping screws $i^1$ and $i^2$ are then retightened, the gauge is again ready for use. In connection therewith a millimeter scale $a^7$ on the outer side of the casing $A$ is used for coarsely adjusting the sleeve $J$ with relation to the casing $A$, while for the accurate adjustment the precision indicator $K$ is preferably shifted in its holder. In order to increase the measuring range even more, the nuts $L^1$ may be removed and the pins $L$ replaced by other pins of greater length.

The subject-matter of the invention possesses over the well-known feeling bolt hole gauges the advantage of allowing an accurate measuring also of obliquely or horizontally arranged bores, because the gauge then rests on the non-shiftable gauging bolt so that its weight does not have any influence on the measuring.

I claim—

1. A hole gauge comprising in combination a casing, a movable and a stationary gauging bolt mounted in said casing, at least two supporting bolts shiftably mounted in said casing, an indicating device, a bolt for transferring the movement of the movable gauging bolt to the indicating device, and shiftable parts provided with planes inclined to the axes of the supporting bolts, these shiftable parts being rigidly connected with the said transferring bolt and arranged for cooperation with the supporting bolts so as to cause the latter to be dependent in their movements on the said shiftable parts, a rotary member interposed between the movable gauging bolt and the said transfer bolt and arranged between the said shiftable parts, and a part rigidly connected with said casing and having a plane inclined to the direction of movement of said movable gauging bolt and designed to support the rotary member for rolling motion on it.

2. A hole gauge comprising in combination a casing, a movable and a stationary gauging bolt mounted in said casing, at least two supporting bolts shiftably mounted in said casing, an indicating device, a bolt for transferring the movement of the movable gauging bolt to the indicating device, and shiftable part provided with planes inclined to the axes of the supporting bolts, these shiftable parts being rigidly connected with the said transferring bolt and arranged for cooperation with the supporting bolts so as to cause the latter to be dependent in their movements on the said shiftable parts, a rotary member interposed between the movable gauging bolt and the said transfer bolt and arranged between the said shiftable parts, a part rigidly connected with said casing and having a plane inclined to the direction of movement of said movable gauging bolt and designed to support the rotary member for rolling motion on it, and means for varying the inclination of the last said inclined plane.

3. A hole gauge comprising in combination a movable and a stationary gauging bolt, at least two shiftable supporting bolts, an indicating device, a bolt for transferring the movement of the movable gauging bolt to the indicating device and shiftable parts provided with planes inclined to the axes of the supporting bolts, these shiftable parts being rigidly connected with the said transferring bolt and arranged for cooperation with the supporting bolts so as to cause the latter to be dependent in their movements on the said shiftable parts, a rotary member interposed between the movable gauging bolt and the said transferring bolt and arranged between the said shiftable parts, the inclination of the inclined planes of the shiftable parts being of such a kind that a pressure exerted only on the end faces of the supporting bolts cannot produce a shifting movement of the said transfer bolt.

4. A hole gauge comprising in combination a casing, a movable and a stationary gauging bolt mounted in said casing, at least two supporting bolts shiftably mounted in said casing, an indicating device, a bolt for transferring the movement of the movable gauging bolt to the indicating device, and shiftable parts provided with planes inclined to the axes of the supporting bolts, these shiftable parts being rigidly connected with the said transferring bolt and arranged for cooperation with the supporting bolts so as to cause the latter to be dependent in their movement on the said shiftable parts, a rotary member interposed between the movable gauging bolt and the said transferring bolt and arranged between the said shiftable parts, and a part rigidly connected with said casing and having a plane inclined to the direction of movement of said movable gauging bolt and designed to support the rotary member for rolling motion on it, the inclinations of the inclined planes of the shiftable parts cooperating with the supporting bolts and of the inclined plane rigidly connected with the casing being chosen so that the shifting movement of each supporting bolt is about equal to half the length of the corresponding shifting movement of the gauging bolt.

5. A hole gauge comprising a casing, a plurality of supporting bolts slidably mounted in said casing, a gauging bolt stationarily mounted in said casing, a second gauging bolt slidably mounted in said casing, and transmission means between said movable gauging bolt and said supporting bolts whereby the latter are shifted by the former.

The foregoing specification signed at Essen, Germany, this 14th day of January, 1925.

KARL LAUER.